(12) United States Patent
Edelson

(10) Patent No.: US 7,327,105 B2
(45) Date of Patent: Feb. 5, 2008

(54) MESH CONNECTED ELECTRICAL ROTATING MACHINE WITH SPAN CHANGING

(75) Inventor: Jonathan Sidney Edelson, Portland, OR (US)

(73) Assignee: Borealis Technical Limited (GI)

( * ) Notice: Subject to any disclaimer, the term of this patent is extended or adjusted under 35 U.S.C. 154(b) by 0 days.

(21) Appl. No.: 11/525,639

(22) Filed: Sep. 21, 2006

(65) Prior Publication Data

US 2007/0013238 A1    Jan. 18, 2007

Related U.S. Application Data

(60) Division of application No. 11/029,978, filed on Jan. 4, 2005, now Pat. No. 7,116,019, which is a division of application No. 10/132,936, filed on Apr. 26, 2002, now Pat. No. 6,838,791, and a continuation-in-part of application No. 09/713,654, filed on Nov. 15, 2000, now Pat. No. 6,657,334.

(60) Provisional application No. 60/286,862, filed on Apr. 26, 2001.

(51) Int. Cl.
*H02P 1/18* (2006.01)

(52) U.S. Cl. ............... 318/254; 318/138; 318/439; 318/801; 318/798; 310/179

(58) Field of Classification Search ........ 318/138, 318/254, 439, 798–801; 310/179
See application file for complete search history.

(56) References Cited

U.S. PATENT DOCUMENTS

| | | | |
|---|---|---|---|
| 3,453,512 A * | 7/1969 | Polakowski | 318/138 |
| 3,808,481 A | 4/1974 | Rippel | |
| 3,821,619 A | 6/1974 | Hoffman | |
| 4,607,204 A | 8/1986 | Setoya | |
| 4,611,157 A | 9/1986 | Miller et al. | |
| 4,713,594 A | 12/1987 | Bose et al. | |
| 4,755,732 A | 7/1988 | Ando | |
| 5,075,610 A | 12/1991 | Harris | |
| 5,661,379 A * | 8/1997 | Johnson | 318/139 |
| 5,686,770 A | 11/1997 | Naito | |
| 5,703,457 A | 12/1997 | Davis | |
| 5,786,673 A * | 7/1998 | Johnson | 318/139 |
| 6,064,172 A | 5/2000 | Kuznetsov | |
| 6,101,109 A | 8/2000 | Duba et al. | |
| 6,153,953 A | 11/2000 | Isozaki et al. | |
| 6,175,272 B1 | 1/2001 | Takita | |
| 6,768,279 B1 | 7/2004 | Skinner et al. | |

* cited by examiner

*Primary Examiner*—Rina Duda

(57) ABSTRACT

An electrical rotating apparatus is provided that has variable impedance. This is achieved by connecting one of the polyphase components of the apparatus in a mesh connection. The spanning value, L, of such a mesh connection may be varied by changing the harmonic content supplied by an inverter component. Also provided is a method for connecting an inverter to a motor, wherein a switching arrangement permits the simple alteration between various mesh connections of different span value, changing thereby the Volts/Hertz ratio of the motor.

13 Claims, 11 Drawing Sheets

5 phase mesh with spanning value of 2
relative winding voltage of 1.90

5 phase mesh with spanning value of 1
relative winding voltage of 1.18

7 phase mesh with spanning value of 3
relative winding voltage of 1.95

7 phase mesh with spanning value of 2
relative winding voltage of 1.56

7 phase mesh with spanning value of 1
relative winding voltage of 0.87

9 phase mesh with spanning value of 4
relative winding voltage of 1.97

9 phase mesh with spanning value of 3
relative winding voltage of 1.73

9 phase mesh with spanning value of 2
relative winding voltage of 1.29

9 phase mesh with spanning value of 1
relative winding voltage of 0.68

11 phase mesh with spanning value of 5
relative winding voltage of 1.98

11 phase mesh with spanning value of 4
relative winding voltage of 1.82

11 phase mesh with spanning value of 3
relative winding voltage of 1.51

11 phase mesh with spanning value of 2
relative winding voltage of 1.08

11 phase mesh with spanning value of 1
relative winding voltage of 0.56

Figure 11

13 phase mesh with spanning value of 6
relative winding voltage of 1.99

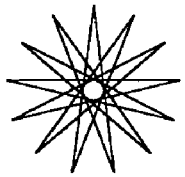

13 phase mesh with spanning value of 5
relative winding voltage of 1.87

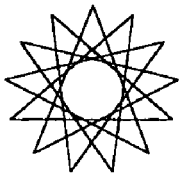

13 phase mesh with spanning value of 4
relative winding voltage of 1.65

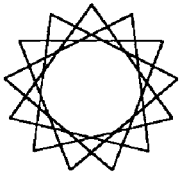

13 phase mesh with spanning value of 3
relative winding voltage of 1.33

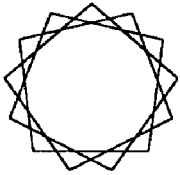

13 phase mesh with spanning value of 2
relative winding voltage of 0.93

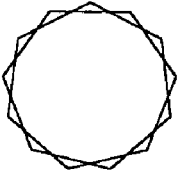

13 phase mesh with spanning value of 1
relative winding voltage of 0.48

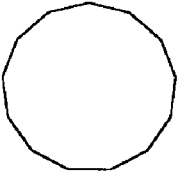

Figure 12

15 phase mesh with spanning value of 7
relative winding voltage of 1.99

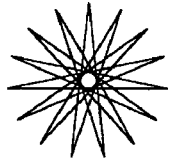

15 phase mesh with spanning value of 6
relative winding voltage of 1.90

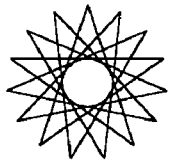

15 phase mesh with spanning value of 5
relative winding voltage of 1.73

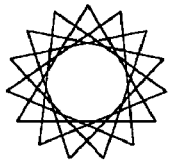

15 phase mesh with spanning value of 4
relative winding voltage of 1.49

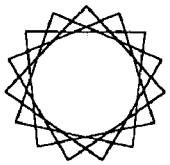

15 phase mesh with spanning value of 3
relative winding voltage of 1.18

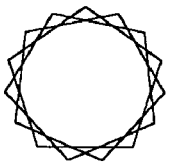

15 phase mesh with spanning value of 2
relative winding voltage of 0.81

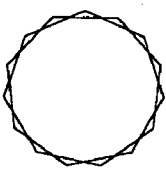

15 phase mesh with spanning value of 1
relative winding voltage of 0.42

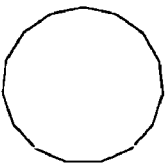

MESH CONNECTED ELECTRICAL ROTATING MACHINE WITH SPAN CHANGING

CROSS-REFERENCE TO RELATED APPLICATIONS

The present invention is a Divisional of U.S. patent application Ser. No. 11/029,978 filed Jan. 4, 2005 now U.S. Pat. No. 7,116,019, which is a Divisional of U.S. patent application Ser. No. 10/132,936 filed Apr. 26, 2002 and now U.S. Pat. No. 6,838,791, and which claims the benefit of U.S. Provisional App. No. 60/286,862 filed Apr. 26, 2001. U.S. patent application Ser. No. 10/132,936 is a Continuation-in-part of U.S. patent application Ser. No. 09/713,654, filed Nov. 15, 2000 now U.S. Pat. No. 6,657,334.

BACKGROUND OF THE INVENTION

The present invention relates to motors and their inverter drives. In particular it related to methods and apparatus for connecting polyphase devices.

An alternating current motor is commonly driven by an inverter. An inverter is a device capable of supplying alternating current of variable voltage and variable frequency to the alternating current motor, allowing for control of machine synchronous speed and thus of machine speed. The inverter may also be used with alternating current generators, and can cause an alternating current motor to act as a generator for braking applications. An alternating current motor may be an induction motor, a synchronous motor with either a wound rotor or permanent magnet rotor, or a brushless DC motor.

In many cases, the cost of the inverter is considerably greater than the cost of the motor being supplied. It is thus necessary to minimize the size of the inverter power electronics in order to control system cost.

Whereas the alternating current machine itself may have substantial overload capability, and may carry currents of the order of five to ten times full rated current for periods measured in minutes, the overload capability of the inverter electronics is severely limited. Exceeding the voltage or current ratings of the inverter electronics will swiftly cause device failure. Commonly, inverter electronics is specified such that it can tolerate 150% of nominal full load current for 1 minute, and for any given motor, and inverter will be selected which has the same nominal current capability as that of the motor.

Voltage is set internally by the inverter system or by the rectified supply voltage. Voltage overload is normally not specified, and will cause near instantaneous destruction of semiconductor elements. The voltage ratings of the semiconductors instead set the maximum output voltage of the inverter system, and an inverter will be selected which has a maximum output voltage that matches the operating voltage of the motor at full speed.

With any reasonably sized inverter, substantial motor overload capabilities remain untapped.

Electrical rotating machinery presents impedance that changes with mechanical load and rotational velocity. As the speed of the electrical rotating machine is increased, the voltage produced by a generator, or the voltage required by a motor will tend to increase proportionally. For example, in an induction motor, in order to maintain a constant magnetic field strength as the applied frequency is changed, a constant ratio of applied voltage to frequency is maintained. For permanent magnet machines, the back-off produced by the motor will increase as rotor speed increases, again requiring increased voltage in order to drive the machine. U.S. Pat. No. 6,812,661 to Maslov discloses changing motor topology on a dynamic basis to obtain maximum efficiency for each of a plurality of operating speed ranges. A plurality of mutually exclusive speed ranges between startup and a maximum speed at which a motor can be expected to operate are identified and a different number of the motor stator winding coils that are to be energized are designated for each speed range. The number of energized coils is changed dynamically when the speed crosses a threshold between adjacent speed ranges. Even direct current machines (not covered by the present invention) require increased voltage as speed is increased, if magnetic field strength is maintained as a constant.

In general, the required voltage is expressed in terms of Volts/Hertz.

In many traction application, there is limited available electrical power. Thus requirements for high overload capability can only be met at low speed, where high torque is required for starting, but reduced speed means that mechanical power output is still low. Such low speed torque requirements require high current to flow though the motor, but do not require high operating voltage. It is thus possible to trade high speed operating capability for low speed overload capability at the design stage of a motor drive system.

By increasing the number of series turns in the motor windings, higher slot current may be achieved with the same terminal current, thus permitting the same inverter to provide greater overload current to the motor. This increase in overload capability comes at a substantial cost. The increased number of series turns means that the motor operating voltage is increased, operation at high speed is prevented. Most motors are designed for dual voltage operation, through the expedient of operating various subcircuits of the motor in series or parallel connection. The change between series and parallel connection may be accomplished though suitable contactor arrangements, permitting the motor to be operated with a higher number of series turns at low speed, and a lower number of series turns at high speed. For a simple three phase alternating current machine system, such a system would require at least two single-pole three-phase contactors, and would only offer a factor of 1.7 increase in low speed overload capability. With three contactors, a factor of two change is possible.

The change in series turns may be considered a change in alternating current machine impedance, or current versus voltage relation. Normally, an alternating current machine will have a fixed relationship between synchronous speed and impedance, characterized by the Volts/Hertz ratio. For a given inverter and machine frame, a machine wound with a higher Volts/Hertz ratio will have a lower maximum speed, but higher peak low speed torque.

It is thus necessary to provide for an alternating current machine drive system in which the alternating current machine presents a variable Volts/Hertz ratio to the inverter. For high speed operation, the Volts/Hertz ratio would be adjusted to a low value, in order to maintain a suitable alternating current machine operational voltage. For low speed operation, the Volts/Hertz ratio would be adjusted to a higher value, so as to permit high overload torque operation.

BRIEF SUMMARY OF THE INVENTION

From the foregoing it will be appreciated that a need as arisen for electrical rotating apparatus that has variable impedance.

In accordance with one embodiment of the present invention, an electrical rotating apparatus is disclosed that comprises two polyphase circuit elements, each having N phases. The first polyphase circuit element, which may be, for example, an inverter, has N outputs, and the second polyphase circuit element comprises N single-phase sub-elements. Each sub-element comprises an even- and an odd-numbered terminal. The odd-numbered terminals are individually connected electrically to the N outputs of the first circuit element in a first sequence. The sequence is in either ascending or descending order of phase angle. The even-numbered terminals are individually connected electrically to the odd-numbered terminals in a mesh connection in a second sequence, which has been shifted in relation to the first sequence according to a spanning value, L.

In accordance with a second embodiment of the present invention, an electrical rotating apparatus is disclosed that comprises two polyphase circuit elements, each having N phases, and an N-pole, N-way switch having 2N terminals. The first polyphase circuit element, which may be, for example, an inverter, has N outputs, and the second polyphase circuit element comprises N single-phase sub-elements. Each sub-element comprises an even- and an odd-numbered terminal. The odd-numbered terminals are individually connected electrically to the N outputs of the first circuit element in a first sequence. The sequence is in either ascending or descending order of phase angle. The N-poles of the switch are also individually connected electrically to the N outputs of the first circuit element in a first sequence. The N ways of the switch are individually connected electrically to the even-numbered terminals in a mesh connection in a second sequence, which has been shifted in relation to the first sequence according to a spanning value, L, which may be selected according to the operation of the switch.

In accordance with a third embodiment of the present invention, a drive system is provided for driving the N single phase sub-elements of a first polyphase circuit element in which each sub-element having an odd-numbered and an even-numbered terminal that comprises a second polyphase circuit element, an N-pole, N-way switch having 2N terminals, and a terminal block. The second polyphase circuit element, which may be, for example, an inverter, has N outputs. The terminal block has 2N terminals comprising a first set of N terminals for connection to each odd-numbered terminal and a second set of N terminals for connection to each even-numbered terminal. The first set of N terminals is individually connected electrically to the N outputs of the second circuit element in a first sequence. The sequence is in either ascending or descending order of phase angle. The N poles of the switch are also individually connected electrically to the N outputs of the second circuit element in a first sequence. The N ways of the switch are individually connected electrically to the second set of N terminals in a second sequence, which has been shifted in relation to the first sequence according to a spanning value, L, which may be selected according to the operation of the switch.

In accordance with a fourth embodiment of the present invention, a mesh-connected electrical rotating apparatus having a variable spanning number, L, is disclosed. A terminal block is disclosed for connection to a first polyphase circuit element, a second polyphase element and an N-pole, N-way switch. The first polyphase circuit element, which may be, for example, an inverter, has N outputs. The terminal block has N ordered terminals for connection to the N outputs of the first polyphase circuit element in a first sequence based on the phase angle order of the first polyphase element. The second polyphase circuit element comprises N single-phase sub-elements. Each sub-element comprises an even- and an odd-numbered terminal. The odd-numbered terminals are individually connected electrically to the N terminals of the terminal block in a first sequence. The N poles of the switch are also individually connected electrically to the N terminals of the terminal block in a first sequence. The N ways of the switch are individually connected electrically to the even-numbered terminals in a second sequence, which has been shifted in relation to the first sequence according to a spanning value, L, which may be selected according to the operation of the switch.

A technical advantage of the present invention is that high torque overload may be provided at low speeds whilst sufficient voltage is also provided for high-speed applications.

A, further technical advantage of the present invention is that the spanning value L may be altered in a particularly simple switching arrangement to obtain a change in operational Volts/Hz ratio.

A further technical advantage of the present invention is that varying the phase angle difference across each motor phase by changing the harmonic applied by the inverter to the mesh connection, provides a change in Volts/Hz ratio through a logical change of the output synthesized by the inverter. This means that the motor may have a fixed electrical connection to the inverter. A yet further technical advantage is that the change in harmonic content may be obtained in a smooth fashion, successively passing through various admixtures of harmonic components.

A further technical advantage of the present invention is that by changing the spanning value L, the same machine pole count is maintained.

BRIEF DESCRIPTION OF THE SEVERAL VIEWS OF THE DRAWING

For a more complete understanding of the present invention and the technical advantages thereof, reference is made to the following description taken with the accompanying drawings, in which:

FIGS. 7-12 are diagrammatic representations of the mesh connections possible for various phase values.

DETAILED DESCRIPTION OF THE INVENTION

Figure 1:
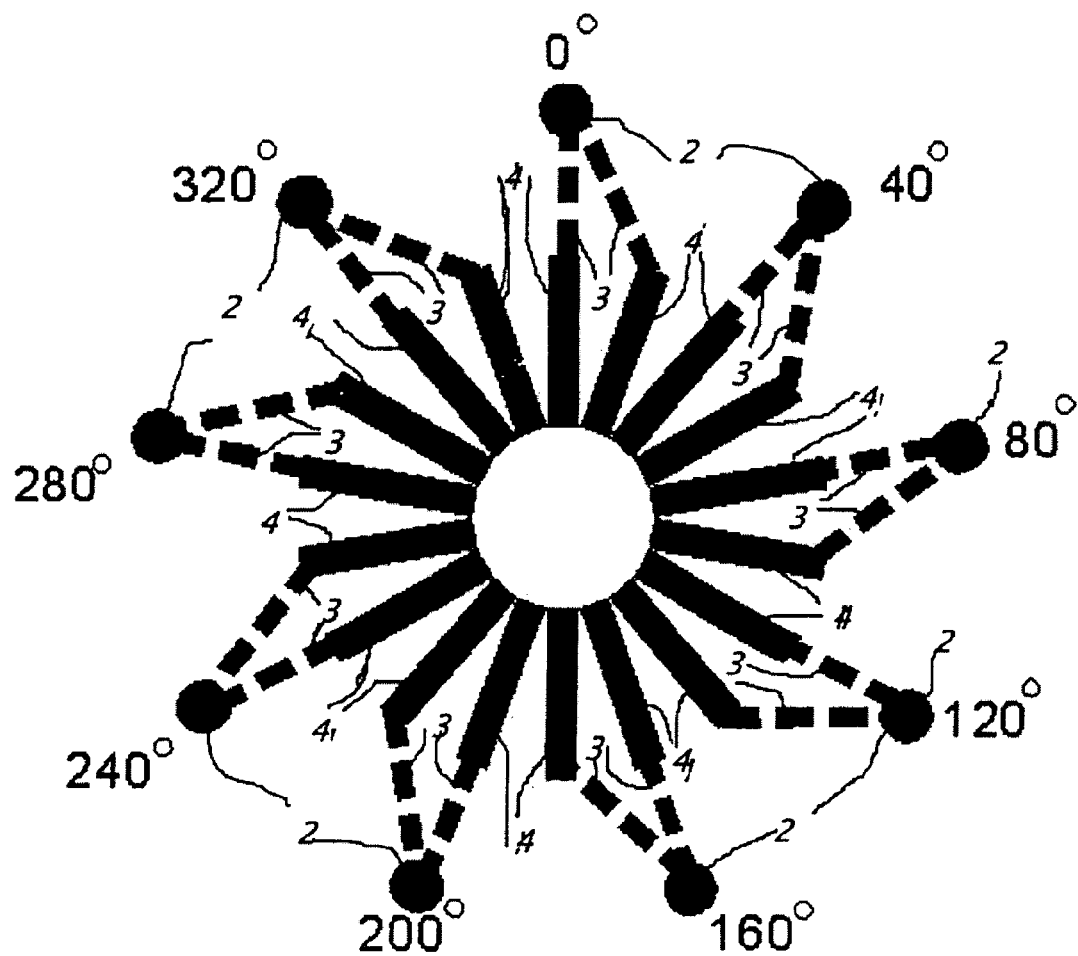
FIG. 1 is a diagrammatic representation of a motor stator and windings

In the present invention a high phase order induction machine is used with each phase terminal separately connected to an inverter output. The windings of the induction machine are wound as full span connected windings, and the motor terminals are connected with a mesh connection to produce a low impedance output. The inverter is capable of operating with a variable phase sequence that changes the effective impedance of the motor.

In a mesh connected machine, the voltage applied to a given winding, which is measured from one terminal of the winding to another, will in general be different from the supply voltage fed to the machine. The reason for this is that the supply will be from a machine of different connection, and thus the relevant voltage measurements will give different results. Specific identified phase-to-phase voltages will always be the same for two connected high phase order machines, however the voltage placed across a winding or switching element will likely be different.

The following equations relate the voltage placed across the windings of a mesh connected machine to the voltages applied to the machine terminals as measured between the terminal and neutral. These are the equations which relate the output voltages of a star connected supply to the winding voltages of a mesh connected motor, and can be inverted to relate a mesh connected supply to a star connected motor. The equations could be used twice to describe a mesh connected supply connected to a mesh connected motor.

$$V_K = V_{MAX} \text{Re}\left\{ e^{ih\left(\omega t + \frac{2K}{m}\pi\right)} \right\} \quad (1)$$

Equation 1 describes the line to neutral voltage of the supply, where m is the number of phases in a balanced supply, K is the particular phase of interest, and may range from 0 to m-1, ω is the frequency of the alternating current in radians per unit time, t is time, h is the harmonic order being generated, and $V_{MAX}$ is the peak voltage of the output waveform. The equation is written using standard complex exponentiation form, in which the constant e is raised to a complex number. In this case, the exponent is a purely imaginary value, thus the result of the exponentiation has constant periodicity over time. Only the real portion of this periodic function is used.

The terms in the exponent include a function of time, which results in the periodic nature of the voltage with time, and a constant rotation term, which results in the phase difference between the various phases.

Rearranging Equation 1, clearly separating the constant and periodic terms, gives:

$$V_K = \text{Re}\left( V_{MAX} e^{ih\omega t} e^{i\frac{2hK}{m}\pi} \right) \quad (2)$$

It is clearly seen that each phase differs from the other phases only by the constant rotation term, and that the periodic term does not depend in any way upon the particular phase.

The voltage across the particular winding K as a function of the voltage applied to its two ends is given by $$VW_K = V_K - V_{(K+L)\%m} \quad (3)$$

The voltages applied to winding K are simply that of phase K and phase K+L, where L is the spanning value for the particular mesh connection, which represents the number of inverter output phases between the first and second terminal of each single phase winding. The greater the spanning value, the greater the voltage placed upon a winding for a given inverter output voltage. Expanding Equation 3 using the terms in Equation 2 gives:

$$= \text{Re}\left( V_{MAX} e^{ih\omega t} e^{i\frac{2hK}{m}\pi} \right) - \text{Re}\left( V_{MAX} e^{ih\omega t} e^{i\frac{2h(K+L)}{m}\pi} \right) \quad (4)$$

Equation 4 may be rearranged as follows:

$$= \text{Re}\left( V_{MAX} e^{ih\omega t} \left( e^{i\frac{2hK}{m}\pi} - e^{i\frac{2h(K+L)}{m}\pi} \right) \right) \quad (5)$$

$$= \text{Re}\left( V_{MAX} e^{ih\omega t} \left( e^{i\frac{2hK}{m}\pi} - e^{i\frac{2hK}{m}\pi} \cdot e^{i\frac{2hL}{m}\pi} \right) \right) \quad (6)$$

$$= \text{Re}\left( V_{MAX} \left( 1 - e^{i\frac{2hL}{m}\pi} \right) e^{ih\omega t} e^{i\frac{2hK}{m}\pi} \right) \quad (7)$$

Equation 7 is the desired result, separating the exponential term into constant and periodic portions of the various variables. Of particular interest is that the term $V_{MAX}$, the periodic term, and the constant rotation term all remain as in the original equation, but an additional term is added. This term depends upon the applied harmonic h, the spanning value L, the number of phases m, but is independent of the particular phase K and is also independent of frequency ω or time t.

Equation 7 shows that the voltage applied to a winding depends upon the voltage output of the supply, but it also depends upon the harmonic order h and the spanning value L. By changing the spanning value, as for example by connecting the machine using a different mesh connection, the voltage applied to the winding will change even if the voltage output of the supply remains constant.

These equations demonstrate that for a given machine, the Volts/Hz ratio of the machine may be changed by altering either the harmonic applied by the inverter to the mesh connection, or by altering the spanning value L of the mesh connection between the inverter and the rotating machine.

The advantage of changing the harmonic applied by the inverter to the mesh connection is that the change in Volts/Hz ratio may be obtained through a logical change of the output synthesized by the inverter. This means that the motor may have a fixed electrical connection to the inverter. This technique is disclosed in my co-pending application Ser. No. 09/713,654, filed Nov. 15, 2000, entitled "High Phase Order Induction Machine with Mesh Connection", now U.S. Pat. No. 6,657,334.

Furthermore, the change in harmonic content may be obtained in a smooth fashion, successively passing through various admixtures of harmonic components. Thus there is no sudden discontinuity in drive when switching between harmonic operating states. Disadvantages of this technique are that it requires a machine capable of operation with harmonic drive; e.g. a pole count changing alternating current machine, or a synchronous machine with variable pole count rotor, or a permanent magnet machine with a rotor which reacts both to the fundamental and the harmonic components of the drive waveform. An additional disadvantage with a pole count changing alternating current machine is that the basic efficiency of such a machine will go down as the pole area is reduced. However the elimination of mechanical contactors is a benefit.

The advantage of changing the spanning value L is that the same machine pole count is maintained. Thus methods that change the spanning value L are applicable to machines with fixed pole counts. This includes some wound rotor alternating current machines, as well as most synchronous machines, permanent magnet machines, and brushless DC machines. Furthermore, for alternating current machine operation, pole area is maintained, which increases machine efficiency. Finally, changing the spanning value L generally permits a greater number of possible Volts/Hz ratios to be obtained from the same machine. Disadvantages of changing the spanning value L are that a mechanical contactor arrangement must be used to physically change the electrical connectivity of the mesh connection, and that power to the motor must be interrupted in order to change the mesh connection.

In a rotating electrical machine, each phase winding set can be described by two terminals. There may be a larger number of terminals, but these are always grouped in series or parallel groups, and the entire set can be characterized by two terminals. In a star connected machine, one of these terminals is driven by the inverter or power supply, while the other terminal is connected to the machine neutral point. All current flows through one terminal, through the neutral point into other windings, and though the driven terminals of the other phases. In a mesh-connected machine, these two terminals are connected directly to two different supply points. An example of how this may be done is shown in FIG. 1, in which the stator slots 4 are shown as straight lines running down the inside of the stator, and inverter terminals 2, are shown as circles, alongside which is marked phase angles of each of the inverter terminals. Electrical connections 3 between the winding terminals in stator slots 4 and inverter terminals 2 are represented by dashed lines. Two winding halves are displayed opposite one another, and are actually joined to one another, although this is not shown. The configuration describes a 9 phase machine connected with an L=4 connection—identical to FIG. 2e.

In contrast to three phase systems, in which there are only three inverter terminals and six motor windings terminals, in a high phase count system with N phases, there are N inverter terminals and 2N motor windings terminals. There are thus a substantial number of choices for how an N phase system may be mesh connected. This set of choices is greatly reduced by rotational symmetry requirements, specifically each winding must be connected to two inverter terminals with the same electrical angle difference between them as for every other winding.

Figure 2:
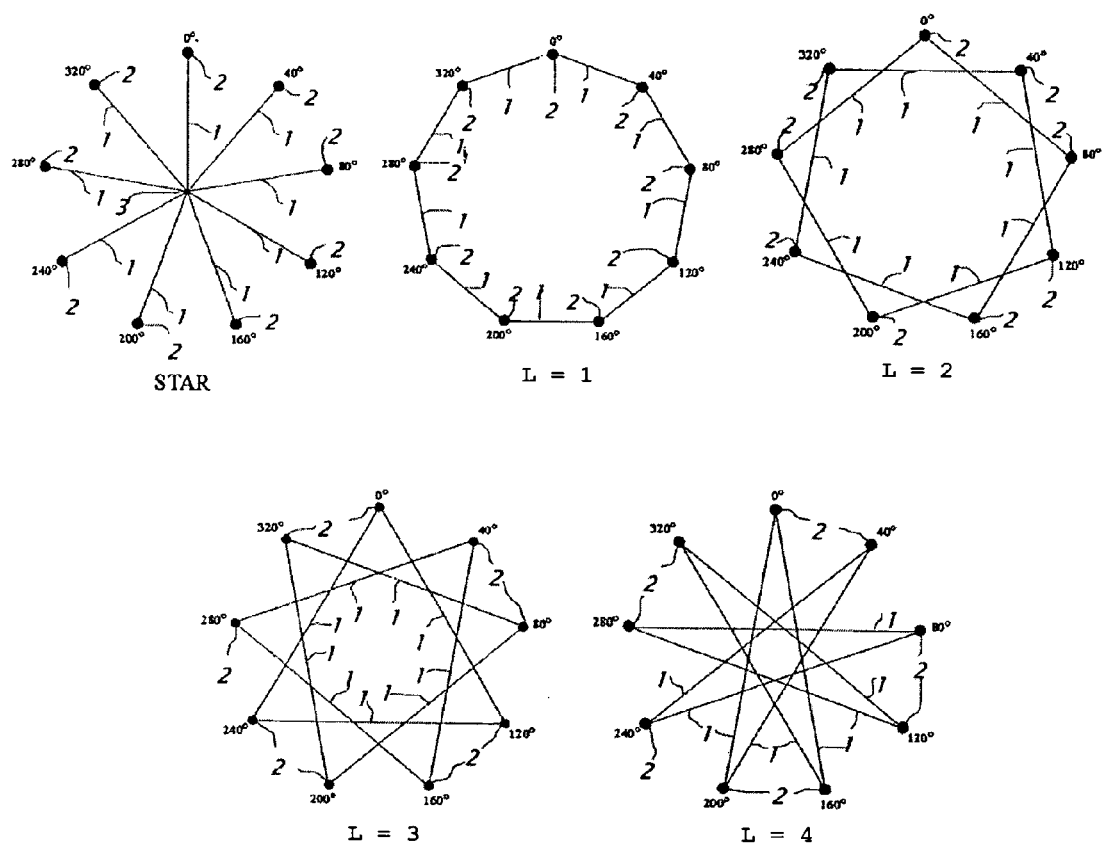
FIG. 2 is a diagrammatic representation of connections possible with a 9-phase polyphase device.

A simple graphical schematic of the permissible inverter to motor windings connections may thus be described, for a polyphase motor having N phases. FIG. 2 shows N evenly spaced points and a center point. Each of these points represents an inverter terminals 2, to which one of the terminals of each of one or more motor windings 1 may be connected. Permissible connections of the N phase windings are either from the center point, to each of the N points on the circle (this being the star connection shown as FIG. 2a) or from each of the N points to another point distant in the clockwise direction.

FIG. 2 shows all permissible connections for a 9 phase system from L=1 to L=4 as well as the star connection. Noted on the star connection diagram are the relative phase angles of the inverter phases driving each terminal. For a given inverter output voltage, measured between an output terminal and the neutral point, each of these possible connections will place a different voltage on the connected windings. For the star connection, the voltage across the connected windings is exactly equal to the inverter output voltage. However, for each of the other connections, the voltage across a winding is given by the vector difference in voltage of the two inverter output terminals to which the winding is connected. When this phase difference is large, then the voltage across the winding will be large, and when this phase difference is small, then the voltage across the winding will be small. It should be noted that the inverter output voltage stays exactly the same in all these cases, just that the voltage difference across a given winding will change with different connection spans. The equation for the voltage across a winding is given by:

$$2\sin\left(\frac{\Delta}{2}\right)V_{out}$$

where $\Delta$ is the phase angle difference of the inverter output terminals driving the winding, and $V_{out}$ is the output to neutral voltage of the inverter.

Thus, referring to FIG. 2, when L=1, the phase angle difference is 40 degrees, and the voltage across a winding is 0.684Vout. When L=2, the phase angle difference is 80 degrees, and the voltage across the winding is 1.29Vout. When L=3, the phase angle difference is 120 degrees, and the voltage across the winding is 1.73Vout. Finally, when L=4, the phase angle difference is 160 degrees, and the voltage across the winding is 1.97Vout. For the same inverter output voltage, different connections place different voltage across the windings, and will cause different currents to flow in the windings. The different mesh connections cause the motor to present different impedance to the inverter. In other words, the different mesh connections allow the motor to use the power supplied by the inverter in different rations of voltage and current, some ratios being beneficial to maximize the torque output (at the expense of available speed), and some ratios to maximize the speed output (at the expense of maximum available torque).

As shown in FIG. 2, the inverter outputs may be represented as points on a unit circle, with the relative positions of the points representing the phase angle of this inverter output. The winding of the motor is composed of individual single phase windings, each of which as two terminals. The single phase windings are represented by line segments, and are the single phase sub-elements described above. The end points of these line segments represent the terminals of the windings. When one terminal of each winding is connected to the origin, and the other terminal is connected to an inverter output as represented by a point on the unit circle, then a star connection may be represented. When line segments are connected between points on the unit circle, then a mesh connection is represented. An M phase symmetrical mesh connection will be represented by a diagram which has M fold rotational symmetry.

Each of the mesh connections may be represented by the spanning value 'L', which represents the number of inverter output phases between the first and second terminal of each single phase winding. The greater the spanning value, the greater the voltage placed upon a winding for a given inverter output voltage. Changes in spanning value may be considered a rotation of the connection between second terminals of each single phase winding and the inverter output terminals.

Figure 3:
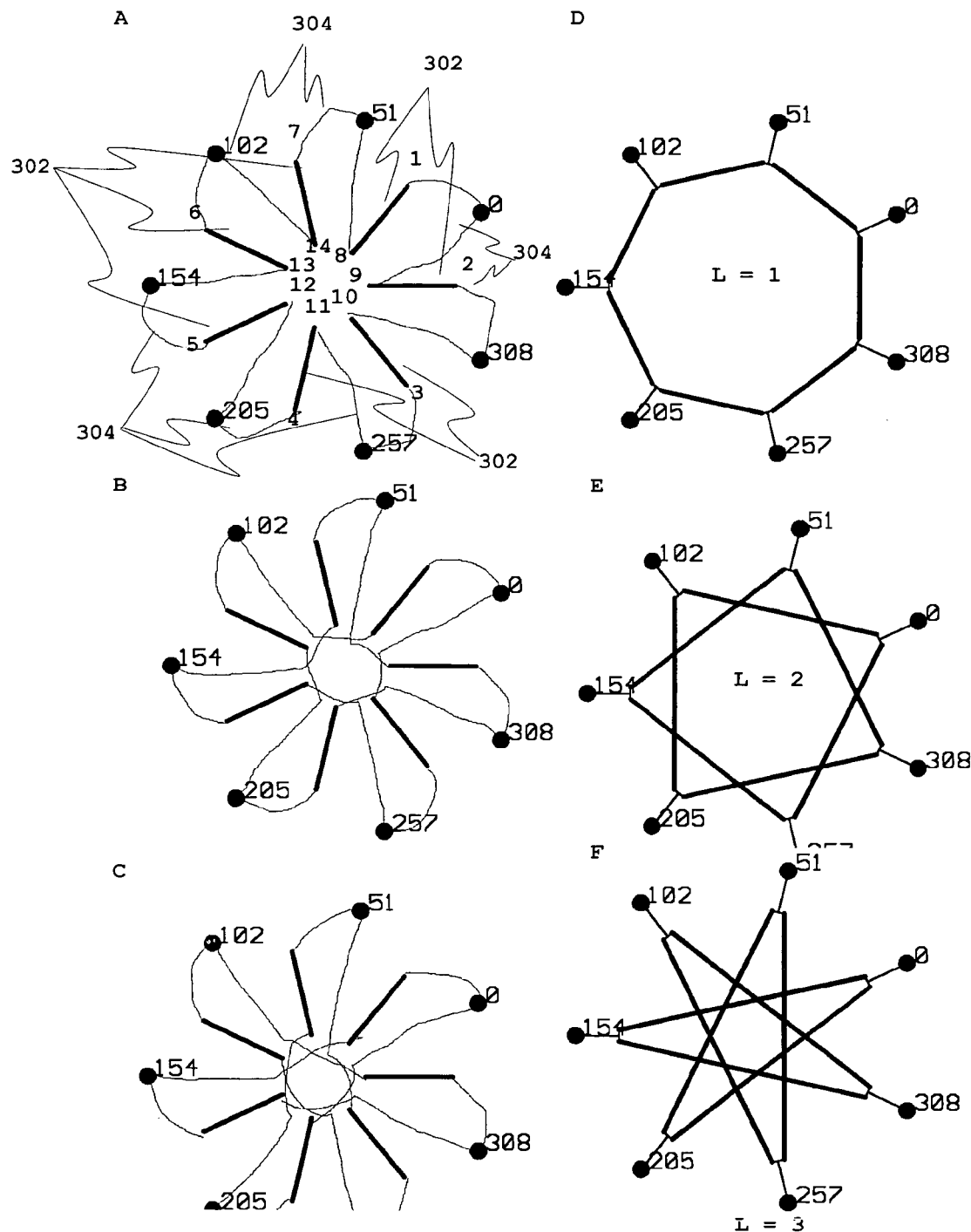
FIG. 3 is a diagrammatic representation of the connections and mesh diagrams for a 7-phase polyphase device.

FIG. 3A shows how these connections are made in a 7-phase polyphase circuit element. Seven single-phase elements 302 are shown, each having a terminal at each end (for the sake of clarity, these terminals are not shown) labelled 1-7 and 8-14; connecting wires 304 link the ends of the single phase sub-elements as shown to form a mesh connection in which L=1. FIGS. 3B and 3C show the connections for L=2 and L=3, respectively; for the sake of clarity, labels have been omitted from FIGS. 3B and 3C. The corresponding mesh diagrams are shown in FIGS. 3D, 3E and 3F.

Figure 4:
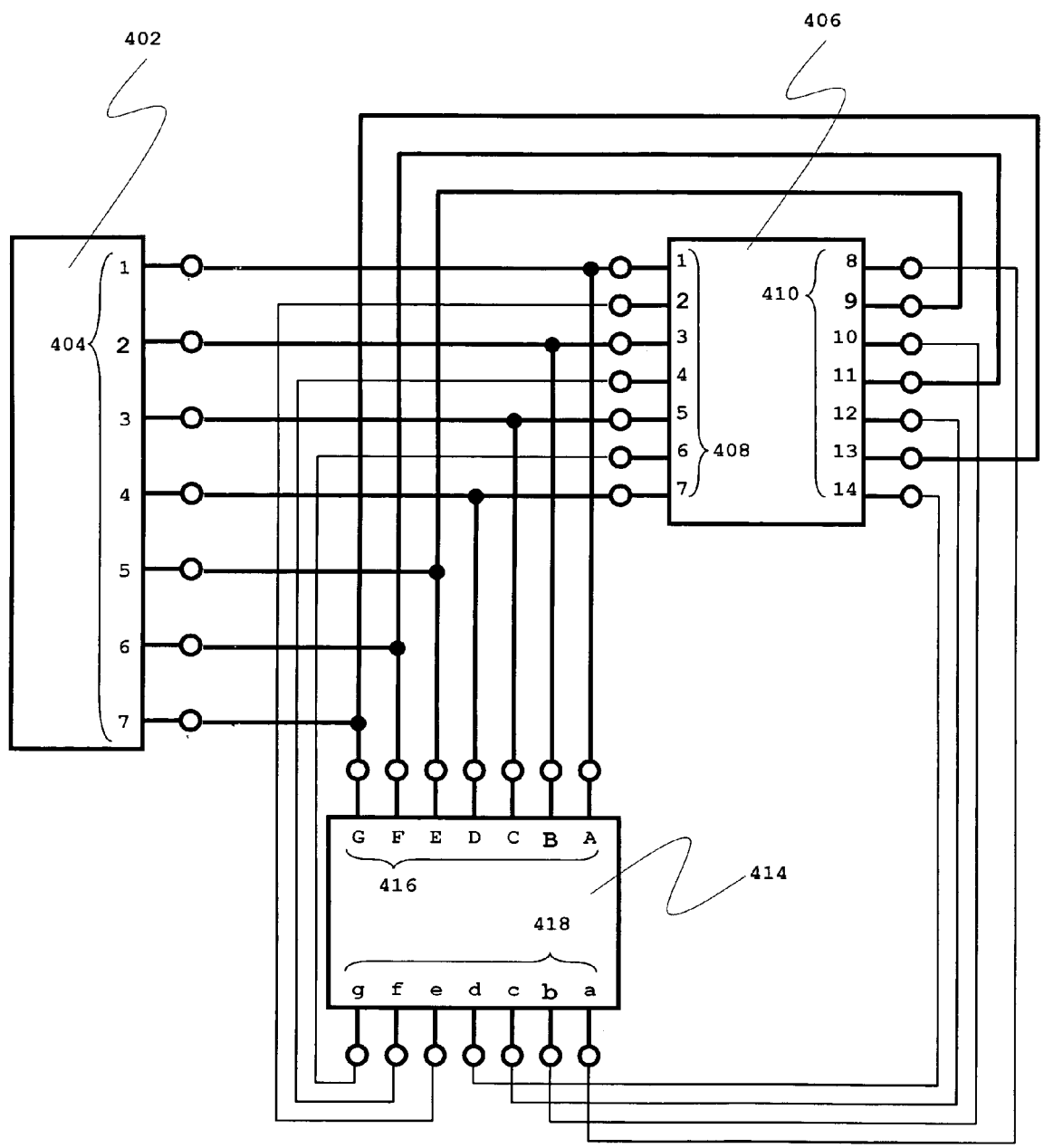
FIG. 4 is a diagrammatic representation of how polyphase devices and a switch may be interconnected.

Referring now to FIG. 4, which shows a general schematic of the present invention, a polyphase circuit element 402 is connected to another polyphase circuit element 406. Polyphase circuit element 406 is mesh connected via switch 414. In order better to exemplify the present invention, polyphase circuit elements 402 and 406 are each shown as having seven phases; this is not intended to limit the scope of the present invention, and polyphase circuit elements having values for phase number of other than seven are contemplated. The seven-phase circuit element 406 may be considered to consist of seven individual single-phase sub-elements. Each such sub-element has two terminals, represented in FIG. 4 by the terminal set 408 labeled 1-7 and the terminal set 410 labeled 8-14, and so there is a single phase circuit element between terminals 1 and 8, 2 and 9, etc (for the sake of clarity, the individual circuit elements are not shown in FIG. 4). These labels correspond to those used in FIG. 3. Describing the sub-elements as having even-numbered (410) and odd-numbered (408) terminals is not intended to limit the scope of the present invention, but instead to illustrate how connections are made. It is to be understood that the terms "even-numbered" and "odd-numbered" are interchangeable, and that "odd-numbered" may be used instead of "even-numbered" and vice versa. Each terminal of the single-phase sub-element is connected to another terminal of another single-phase sub-element via a switch 414 to form a mesh connection. Switch 414 has two sets of terminals 416, labeled A-G, and 418, labeled a-g. The switch alters how the sub-elements of polyphase circuit element 406 are connected to each other, and thereby sets the spanning value, L. The connections between polyphase circuit element 404 and the mesh connected polyphase circuit element 406 are shown in Table 1. Referring to the first row of Table 1, the first three columns of the table indicate that terminal 1 of terminal set 404, terminal 1 of polyphase circuit element 406 and terminal A of terminal set 416 are directly connected to each other, and the last two columns indicate that terminal a of terminal set 418 and terminal 8 of polyphase circuit element 406 are also directly connected to each other, as shown in FIG. 4. The remaining columns (Terminal set 418) indicate how switch 414 changes the connectivity between terminal sets 416 and 418, thereby altering the value for L. Note that for the column headed "*", each sub-element of polyphase circuit element 406 is "short-circuited"; that is, terminal 1 on 406 is connected to terminal 8 on 406, and so on. Under most normal operating conditions, this position of the switch will not be used, and its selection will be prevented. This it may be seen that connections are made to terminal set 416 in a sequence, and the sequence is phase angle order. In this disclosure, the order is ascending order, but descending order is also within the scope of the present invention. It may be seen from Table 1 that the operation of the switch shifts the sequence, but does not change the relative order of the connections. Many switch types are available which are able to 'shift' the connectivity described above. For example the switch may be a rotary switch or a slider switch; it may be mechanical or electronic. The switch may be described as an N-pole N-way switch, in which all of the N poles share the same set of ways, and that each pole goes to one way at a time, and that by rotation or sliding different poles are connected to different ways, always keeping the same relative order. The switch may have an interlock to prevent selection of the A to a option. In one embodiment 402 is an inverter and 406 is a motor.

TABLE 1

| | | | Switching Details | | | | | | | | |
|---|---|---|---|---|---|---|---|---|---|---|---|
| Terminal Set | Terminal on | Terminal Set | | Terminal Set 418 | | | | | | Terminal Set | Terminal on |
| 404 | 406 | 416 | * | L = 1 | L = 2 | L = 3 | L = 3 | L = 2 | L = 1 | 418 | 406 |
| 1 | 1 | A | a | b | c | d | e | f | g | A | 8 |
| 2 | 3 | B | b | c | d | e | f | g | a | B | 10 |
| 3 | 5 | C | c | d | e | f | g | a | b | C | 12 |
| 4 | 7 | D | d | e | f | g | a | b | c | D | 14 |
| 5 | 9 | E | e | f | g | a | b | c | d | E | 2 |
| 6 | 11 | F | f | g | a | b | c | d | e | F | 4 |
| 7 | 13 | G | g | a | b | c | d | e | f | G | 6 |

Table 1 show that 7 possible connections are possible, one is undesirable (marked with a "*") and the remaining six have a two-fold symmetry. Thus the minimum number of positions for the switch is just 3. Table 1 shows that a plurality of ordered phases is connected to terminal set 404, the plurality of ordered phases consisting of the phase outputs from 402 in ascending or descending order of phase angle.

Figure 5:
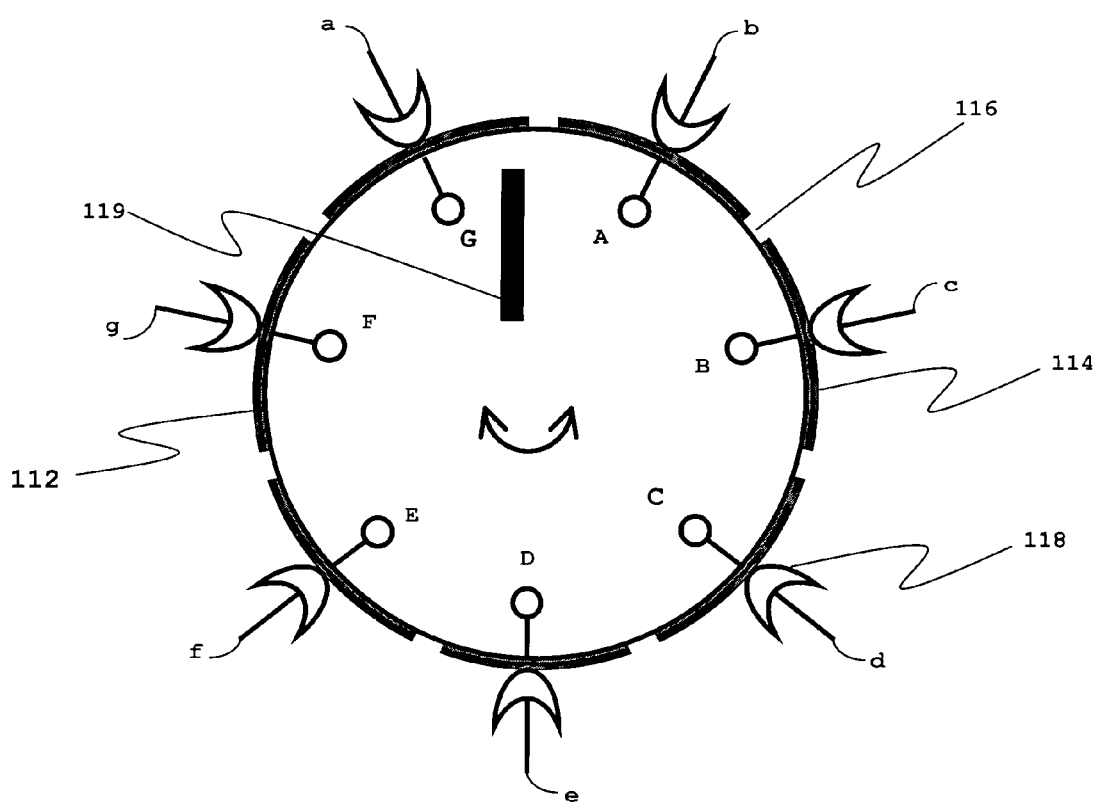
FIG. 5 is a diagrammatic representation of a rotary switch.

Switch 414 of FIG. 4 may be any type of switch that is capable of altering the mesh connection in the manner disclosed. One example of a rotary switch embodiment of switch 414 is shown in FIG. 5, which shows a circular or cylindrical rotor 112 having fixed electrical terminals A to G. These are electrically connected to contact areas 114 on the outside surface, which are separated from each other by an insulating region 116. Cylindrical rotor 112 is rotatable around its axis in either a clockwise or anticlockwise direction. A further set of terminals a to g contact areas 114 via wipers, brushes, cable, braid, or other flexible means 118. Thus terminal A is connected to terminal b. This is the L=1 configuration as shown in Table 1. If the switch is rotated one place clockwise, then the L=2 mesh connection is obtained. To prevent the A to a and B to a, etc connection, a stop 119 is used. Such a segmented cylinder, in which there is a plurality of segments insulated from one another, is akin to the commutator of a brush DC motor, the details of which are well known in the art. Similarly, the contact points or brushes are well known in the art. This contactor arrangement is capable of coupling each second terminal of each single phase winding in turn to the various output terminals of the inverter, with each rotational position of the segmented cylinder giving a different mesh connection. Variations of this arrangement are possible: a set of ordered winding terminals can be arranged in a first circle, and the terminals of the ordered phases of a second device arranged in a second circle; the two circles are concentric to one another and the terminals of the first device are positioned to contact the terminals of the second device. Means to rotate one of the circles to selectively connect the second set of ordered winding terminals of the first device with the ordered terminals of the second device are provided.

Figure 6:
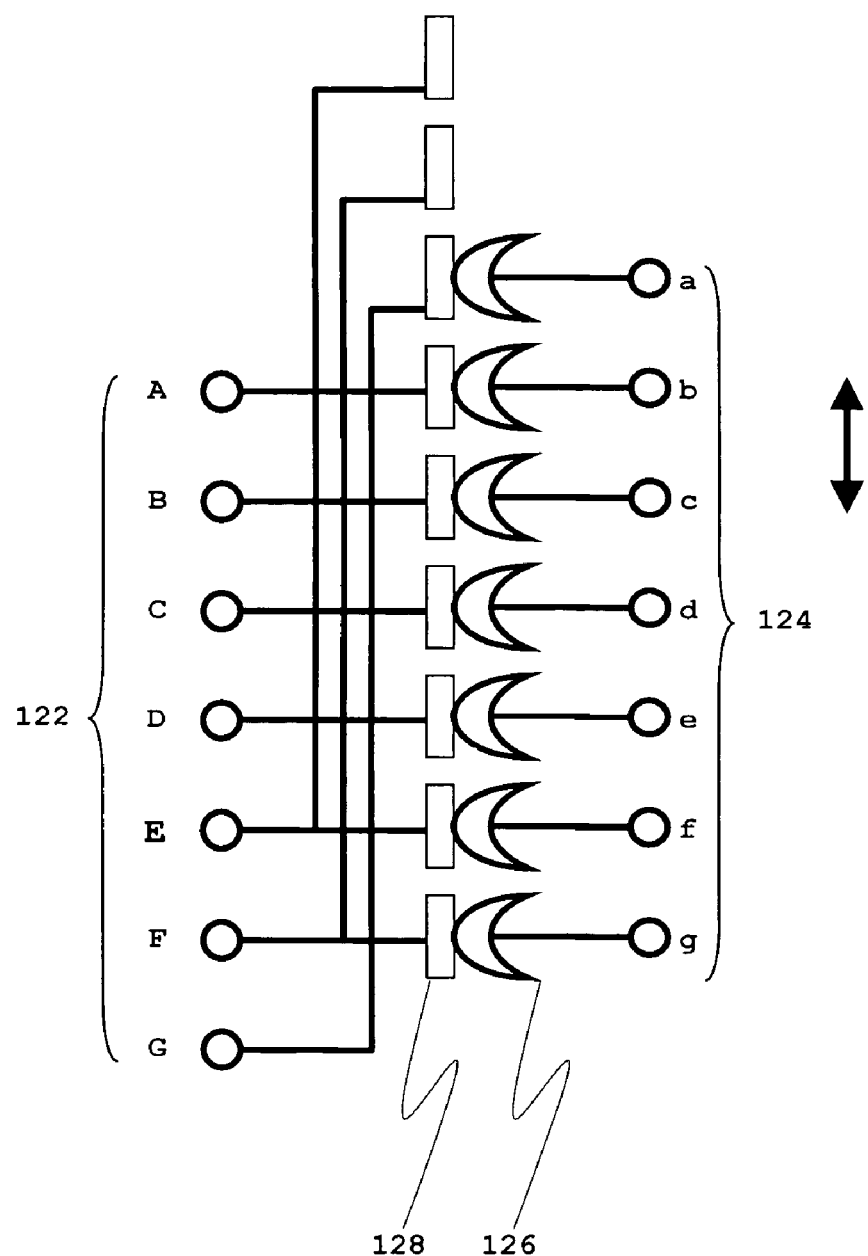
FIG. 6 is a diagrammatic representation of a slider switch.
Figure 7:
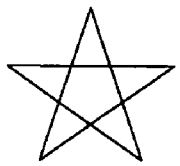
Figure 7:
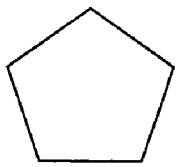
Figure 8:
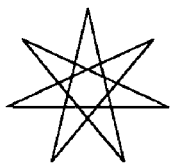
Figure 8:
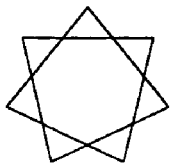
Figure 8:
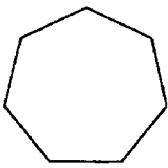
Figure 9:
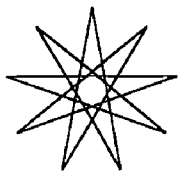
Figure 9:
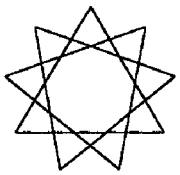
Figure 9:
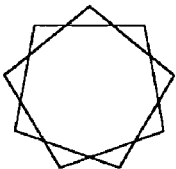
Figure 9:
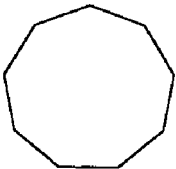
Figure 10:
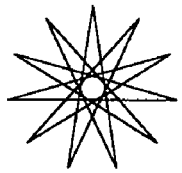
Figure 10:
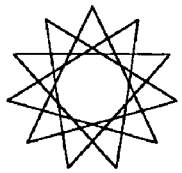
Figure 10:
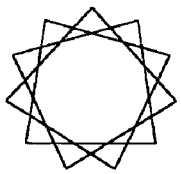
Figure 10:
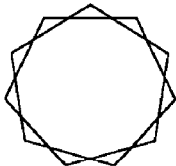
Figure 10:
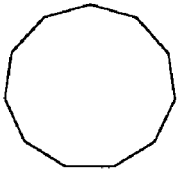

An example of a slider switch embodiment of switch 414 is shown in FIG. 6, which shows a slider switch having a fixed set of terminals 122, and a movable set of terminals 124. The fixed set of terminals is electrically connected to contact areas 128. Terminal set 124 connects to contact areas 128 via wipers or brushes 126. Thus terminal A is connected to terminal b. This is the L=1 configuration as shown in Table 1. If the switch is moved one place upwards, then the L=2 mesh connection is obtained.

Thus the switch 414 enables the Volts/Hertz ratio of the mesh connected machine to be simply changed by rotating the segmented cylinder or sliding the slider to the appropriate position.

Also contemplated by the present invention is a device comprising 402 and a switch 414; 406 in FIG. 4 is then replaced by a terminal block. Thus a unit comprising an inverter and switch is contemplated. This may be used to connect directly to any polyphase motor or other polyphase device.

Also contemplated by the present invention is a device comprising switch 414 and 406; 404 is then replaced by a terminal block. Thus a unit comprising a motor and a switch is contemplated, which may be powered by a polyphase inverter.

EXAMPLES

Specific examples are offered to enhance the disclosure and understanding of the present invention. These examples should in no way be considered limiting. These examples may be considered 'best mode' descriptions, in so far as the optimal motor for any given application will vary considerable with the mechanical requirements of the application. These descriptions will focus upon the differences between the present invention and the prior art, and as such will not focus upon details which are both well known in the art, and unchanged by the present invention, for example bearings or motor housing materials.

To better illustrate the scope of the present invention, Tables 2 to 7 and FIGS. 7 to 12 indicate the possible mesh connections and voltages for 5 to 15 phase devices. In the Tables, the value for V is the voltage across the windings when 1.0 volt is applied by a star connected source.

TABLE 2

5 Phase Mesh Connections.

| 402 Terminal | Phase Angle | 406 1st Terminal | L = 1; V = 1.176 406 2nd Terminal | L = 2; V = 1.902 406 2nd Terminal |
|---|---|---|---|---|
| 1 | 0.0 | 1 | 8 (3) | 10 (5) |
| 2 | 72.0 | 3 | 10 (5) | 2 (7) |
| 3 | 144.0 | 5 | 2 (7) | 4 (9) |
| 4 | 216.0 | 7 | 4 (9) | 6 (1) |
| 5 | 288.0 | 9 | 6 (1) | 8 (3) |

TABLE 3

7 Phase Mesh Connections.

| 402 Terminal | Phase Angle | 406 1st Terminal | L = 1; V = 0.868 406 2nd Terminal | L = 2; V = 1.564 406 2nd Terminal | L = 3; V = 1.950 406 2nd Terminal |
|---|---|---|---|---|---|
| 1 | 0.0 | 1 | 10 (3) | 12 (5) | 14 (7) |
| 2 | 51.4 | 3 | 12 (5) | 14 (7) | 2 (9) |
| 3 | 102.9 | 5 | 14 (7) | 2 (9) | 4 (11) |
| 4 | 154.3 | 7 | 2 (9) | 4 (11) | 6 (13) |
| 5 | 205.7 | 9 | 4 (11) | 6 (13) | 8 (1) |
| 6 | 257.1 | 11 | 6 (13) | 8 (1) | 10 (3) |
| 7 | 308.6 | 13 | 8 (1) | 10 (3) | 12 (5) |

TABLE 4

9 Phase Mesh Connections.

| 402 Terminal | Phase Angle | 406 1st Terminal | L = 1; V = 0.684 406 2nd Terminal | L = 2; V = 1.286 406 2nd Terminal | L = 3; V = 1.732 406 2nd Terminal | L = 4; V = 1.970 406 2nd Terminal |
|---|---|---|---|---|---|---|
| 1 | 0.0 | 1 | 12 (3) | 14 (5) | 16 (7) | 18 (9) |
| 2 | 40.0 | 3 | 14 (5) | 16 (7) | 18 (9) | 2 (11) |
| 3 | 80.0 | 5 | 16 (7) | 18 (9) | 2 (11) | 4 (13) |
| 4 | 120.0 | 7 | 18 (9) | 2 (11) | 4 (13) | 6 (15) |
| 5 | 160.0 | 9 | 2 (11) | 4 (13) | 6 (15) | 8 (17) |
| 6 | 200.0 | 11 | 4 (13) | 6 (15) | 8 (17) | 10 (1) |
| 7 | 240.0 | 13 | 6 (15) | 8 (17) | 10 (1) | 12 (3) |
| 8 | 280.0 | 15 | 8 (17) | 10 (1) | 12 (3) | 14 (5) |
| 9 | 320.0 | 17 | 10 (1) | 12 (3) | 14 (5) | 16 (7) |

TABLE 5

11 Phase Mesh Connections.

| 402 Terminal | Phase Angle | 406 1st Terminal | L = 1; V = 0.563 406 2nd Terminal | L = 2; V = 1.081 406 2nd Terminal | L = 3; V = 1.511 406 2nd Terminal | L = 4; V = 1.819 406 2nd Terminal | L = 5; V = 1.980 406 2nd Terminal |
|---|---|---|---|---|---|---|---|
| 1 | 0.0 | 1 | 14 (3) | 16 (5) | 18 (7) | 20 (9) | 22 (11) |
| 2 | 32.7 | 3 | 16 (5) | 18 (7) | 20 (9) | 22 (11) | 2 (13) |
| 3 | 65.5 | 5 | 18 (7) | 20 (9) | 22 (11) | 2 (13) | 4 (15) |
| 4 | 98.2 | 7 | 20 (9) | 22 (11) | 2 (13) | 4 (15) | 6 (17) |
| 5 | 130.9 | 9 | 22 (11) | 2 (13) | 4 (15) | 6 (17) | 8 (19) |
| 6 | 163.6 | 11 | 2 (13) | 4 (15) | 6 (17) | 8 (19) | 10 (21) |
| 7 | 196.4 | 13 | 4 (15) | 6 (17) | 8 (19) | 10 (21) | 12 (1) |
| 8 | 229.1 | 15 | 6 (17) | 8 (19) | 10 (21) | 12 (1) | 14 (3) |

TABLE 5-continued

11 Phase Mesh Connections.

| 402 Terminal | Phase Angle | 406 1st Terminal | L = 1; V = 0.563 406 2nd Terminal | L = 2; V = 1.081 406 2nd Terminal | L = 3; V = 1.511 406 2nd Terminal | L = 4; V = 1.819 406 2nd Terminal | L = 5; V = 1.980 406 2nd Terminal |
|---|---|---|---|---|---|---|---|
| 9  | 261.8 | 17 | 8 (19)  | 10 (21) | 12 (1) | 14 (3) | 16 (5) |
| 10 | 294.5 | 19 | 10 (21) | 12 (1)  | 14 (3) | 16 (5) | 18 (7) |
| 11 | 327.3 | 21 | 12 (1)  | 14 (3)  | 16 (5) | 18 (7) | 20 (9) |

TABLE 6

13 Phase Mesh Connections.

| 402 Terminal | Phase Angle | 406 1st Terminal | L = 1; V = 0.478 406 2nd Terminal | L = 2; V = 0.929 406 2nd Terminal | L = 3; V = 1.326 406 2nd Terminal | L = 4; V = 1.646 406 2nd Terminal | L = 5; V = 1.870 406 2nd Terminal | L = 6; V = 1.985 406 2nd Terminal |
|---|---|---|---|---|---|---|---|---|
| 1  | 0.0   | 1  | 16 (3)  | 18 (5)  | 20 (7)  | 22 (9)  | 24 (11) | 26 (13) |
| 2  | 27.2  | 3  | 18 (5)  | 20 (7)  | 22 (9)  | 24 (11) | 26 (13) | 2 (15)  |
| 3  | 55.4  | 5  | 20 (7)  | 22 (9)  | 24 (11) | 26 (13) | 2 (15)  | 4 (17)  |
| 4  | 83.1  | 7  | 22 (9)  | 24 (11) | 26 (13) | 2 (15)  | 4 (17)  | 6 (19)  |
| 5  | 110.8 | 9  | 24 (11) | 26 (13) | 2 (15)  | 4 (17)  | 6 (19)  | 8 (21)  |
| 6  | 138.5 | 11 | 26 (13) | 2 (15)  | 4 (17)  | 6 (19)  | 8 (21)  | 10 (23) |
| 7  | 166.2 | 13 | 2 (15)  | 4 (17)  | 6 (19)  | 8 (21)  | 10 (23) | 12 (25) |
| 8  | 193.8 | 15 | 4 (17)  | 6 (19)  | 8 (21)  | 10 (23) | 12 (25) | 14 (1)  |
| 9  | 221.5 | 17 | 6 (19)  | 8 (21)  | 10 (23) | 12 (25) | 14 (1)  | 16 (3)  |
| 10 | 249.2 | 19 | 8 (21)  | 10 (23) | 12 (25) | 14 (1)  | 16 (3)  | 18 (5)  |
| 11 | 276.9 | 21 | 10 (23) | 12 (25) | 14 (1)  | 16 (3)  | 18 (5)  | 20 (7)  |
| 12 | 304.6 | 23 | 12 (25) | 14 (1)  | 16 (3)  | 18 (5)  | 20 (7)  | 22 (9)  |
| 13 | 332.3 | 25 | 14 (1)  | 16 (3)  | 18 (5)  | 20 (7)  | 22 (9)  | 24 (11) |

TABLE 7

15 Phase Mesh Connections.

| 402 Terminal | Phase Angle | 406 1st Terminal | L = 1; V = 0.416 406 2nd Terminal | L = 2; V = 0.813 406 2nd Terminal | L = 3; V = 1.176 406 2nd Terminal | L = 4; V = 1.486 406 2nd Terminal | L = 5; V = 1.732 406 2nd Terminal | L = 6; V = 1.902 406 2nd Terminal | L = 7; V = 1.989 406 2nd Terminal |
|---|---|---|---|---|---|---|---|---|---|
| 1  | 0.0   | 1  | 18 (3)  | 20 (5)  | 22 (7)  | 24 (9)  | 26 (11) | 28 (13) | 30 (15) |
| 2  | 24.0  | 3  | 20 (5)  | 22 (7)  | 24 (9)  | 26 (11) | 28 (13) | 30 (15) | 2 (17)  |
| 3  | 48.0  | 5  | 22 (7)  | 24 (9)  | 26 (11) | 28 (13) | 30 (15) | 2 (17)  | 4 (19)  |
| 4  | 72.0  | 7  | 24 (9)  | 26 (11) | 28 (13) | 30 (15) | 2 (17)  | 4 (19)  | 6 (21)  |
| 5  | 96.0  | 9  | 26 (11) | 28 (13) | 30 (15) | 2 (17)  | 4 (19)  | 6 (21)  | 8 (23)  |
| 6  | 120.0 | 11 | 28 (13) | 30 (15) | 2 (17)  | 4 (19)  | 6 (21)  | 8 (23)  | 10 (25) |
| 7  | 144.0 | 13 | 30 (15) | 2 (17)  | 4 (19)  | 6 (21)  | 8 (23)  | 10 (25) | 12 (27) |
| 8  | 168.0 | 15 | 2 (17)  | 4 (19)  | 6 (21)  | 8 (23)  | 10 (25) | 12 (27) | 14 (29) |
| 9  | 192.0 | 17 | 4 (19)  | 6 (21)  | 8 (23)  | 10 (25) | 12 (27) | 14 (29) | 16 (1)  |
| 10 | 216.0 | 19 | 6 (21)  | 8 (23)  | 10 (25) | 12 (27) | 14 (29) | 16 (1)  | 18 (3)  |
| 11 | 240.0 | 21 | 8 (23)  | 10 (25) | 12 (27) | 14 (29) | 16 (1)  | 18 (3)  | 20 (5)  |
| 12 | 264.0 | 23 | 10 (25) | 12 (27) | 14 (29) | 16 (1)  | 18 (3)  | 20 (5)  | 22 (7)  |
| 13 | 288.0 | 25 | 12 (27) | 14 (29) | 16 (1)  | 18 (3)  | 20 (5)  | 22 (7)  | 24 (9)  |
| 14 | 312.0 | 27 | 14 (29) | 16 (1)  | 18 (3)  | 20 (5)  | 22 (7)  | 24 (9)  | 26 (11) |
| 15 | 336.0 | 29 | 16 (1)  | 18 (3)  | 20 (5)  | 22 (7)  | 24 (9)  | 26 (11) | 28 (13) |

1) Inverter Fed Induction Machine with Switching Arrangement

Well known in the art is the inverter fed induction motor. In the classic arrangement, a conventional three-phase induction motor is supplied with alternating current by an inverter. The inverter synthesizes alternating current of the proper voltage and frequency to operate the motor in a desired mechanical output state, adjusting frequency, voltage, or current as necessary to control motor torque or speed.

With the present invention, an inverter may still feed an induction motor, however additional performance and flexibility of operation may be obtained. As a specific example, a 13-phase inverter is used to supply a 13-phase induction motor.

The 13 phase inverter is composed of components well known in the art, including a rectifier to supply DC power to other components, a DC link filter to maintain constant DC voltage, precharge and control circuitry, and output half bridges. All of these components are well known in the art. Less well known in the art are the specifics of high phase order operation; these are disclosed in U.S. Pat. No. 6,054, 837. In brief, additional output half bridges are used, 13 in the case of the present example. The inverter output has 13 separate phases, each with a phase angle displacement of 1/13 full cycle, as contrasted to the output of a conventional inverter, with 3 separate phases and a phase angle displacement of 1/3 full cycle.

The example 13-phase motor is a 4 pole, 26 slot machine, with 6.5 slots per pole. Conventional lap windings are used, with a 1 to 7 span. There are a total of 26 coils. Turns per coil are selected using conventional calculation for flux per pole and drive frequency; the winding is considered concentrated with a 13/14 span. The 1 to 7 and the 14 to 20 windings are in the same phase, and placed electrically in series, as are the 12 other series pairs of the same relative slot displacement. The net result is a winding with 13 individual series circuits, each of which is at an electrical angle of 1/13 full cycle apart, each with two available terminals, numbered 1 to 26 in order to correspond to the slots associated with the termination.

The two-coil, two-terminal winding sets are as follows, along with the relative electrical angles of the windings:

TABLE 8

| Winding Pair Designation | Electrical Angle (Degrees) |
| --- | --- |
| 1:7, 14:20 | 0 |
| 2:8, 15:21 | 27.7 |
| 3:9, 16:22 | 55.4 |
| 4:10, 17:23 | 83.1 |
| 5:11, 18:24 | 110.8 |
| 6:12, 19:25 | 138.5 |
| 7:13, 20:26 | 166.2 |
| 8:14, 21:1 | 193.8 |
| 9:15, 22:2 | 221.5 |
| 10:16, 23:3 | 249.2 |
| 11:17, 24:4 | 276.9 |
| 12:18, 25:5 | 304.6 |
| 13:19, 26:6 | 332.3 |

These coil sets may be connected in the 6 possible different symmetric mesh connections that may be used with this motor, each presenting a different impedance to the inverter. For example, the L=1 mesh connection may be used. As the highest impedance mesh connection, current requirements from the inverter are reduced, however the voltage requirements are increased. This connection is thus suitable for low speed operation. As the spanning value L is increased to the maximum of 6, the machine impedance is reduced, current requirements are increased, and voltage requirements reduced. This mesh connection would be most suitable for high-speed operation.

The machine may be adjusted between these mesh connections through the use of a 13 pole, 13 way, shared way switch. Such a switch has 13 pole terminals and 13 way terminals, and in one position connects, for example, pole 1 to way 2, pole 2 to way 3, pole 13 to way 1, etc. The switch is electrically connected to the motor such that the 0° winding terminal 1 is connected to pole 1, 27.7° winding terminal 2 is connected to pole 2, etc. The switch is further connected such that 27.7° winding terminal 21 is connected to way 1, 55.4° winding terminal 22 is connected to way 2, etc. In switch position 1, where pole 1 connects to way 1, pole 2 to way 2, etc., the motor will be connected in an L=1 mesh connection. In switch position 2, the motor will be connected in an L=2 mesh connection, etc., with the resulting changes in machine impedance.

2) Inverter Fed Synchronous Machine with Switching Arrangement

A 13-phase inverter and motor winding are used, as above. However the rotor is not a shorted cage as would be used in an induction motor, but instead a permanent magnet rotor, possibly with a shorting cage for starting. Standard synchronous motor control techniques are used, however for different operating speed regimes, different mesh connections are selected in order to best utilize the inverter. Thus the motor is connected in a mesh connection with an N pole N way switch, where N is the number of different phases in the machine. Operation of the switch sets up different mesh connections, changing the impedance of the machine.

3) Generator Fed Resistor Mesh with Switching Arrangement

A set of 7 resistance heaters, each rated 10 Ohms, is supplied with electrical power by a 7 phase generator rated at 100 volts per phase line to neutral. Each resistor has two terminals. The resistors are numbered 1 to 7, and the terminals of each resistor are A and B. Terminal A of each resistor is connected to a corresponding pole of a 7 pole, 7 way, shared way switch. Terminal B of each resistor is connected to a corresponding way of the switch, and is additionally electrically connected to the corresponding output terminal of the generator. In switch position 1, terminal A and B of the same resistor are electrically connected together, leaving no closed circuit path for current to flow. This is an 'off' position.

In switch position 2, the L=1 mesh connection is realized. The voltage placed across each resistor is 86.8 volts, and the power delivered to each resistor is 753 watts.

In switch position 3, the L=2 mesh connection is realized. The voltage placed across each resistor is 156 volts, and the power delivered to each resistor is 2445 watts.

In switch position 4, the L=3 mesh connection is realized. The voltage placed across each resistor is 195 volts, and the power delivered to each resistor is 3802 watts.

4) Brushless DC Machine with Array of Terminals Permitting Installation Time Selection of Mesh Connection.

A 13 phase brushless DC drive is used. This is topologically a 13 phase inverter, however full DC link voltage is placed across each winding in turn as appropriate, and commutation signals are supplied by a rotor position detector. A 13 phase stator as described in 1) above is used, and the rotor is a permanent magnet rotor. In this configuration, no switching element is used to permit the dynamic change of mesh connection. Instead a suitable mesh connection is selected at the time of machine installation and commission. Winding terminals are electrically connected together and connected to the inverter terminals, as is suitable for the service of the machine. For example, a motor which will only see low speed operation will be wired using an L=1 mesh connection, to reduce inverter current capability requirements, whereas a motor which will see high-speed operation will be wired using an L=3 mesh connection, in order to reduce inverter voltage requirements.

Thus it is apparent that there has been provided, in accordance with embodiments of the present invention, rotating induction devices satisfying the advantages set forth above. Although the invention has been described in detail, it should be understood that various changes, substitutions and alterations may be made herein.

Thus this mesh connection technique is applicable to alternating current machines, to wound rotor synchronous machines, as well as to permanent magnet machines and brushless DC motors. It can be used both for motors and for generators, maintaining, for example, a relatively constant output voltage over a large range of generator operating speeds. This mesh connection technique may even be used for polyphase resistive loads, essentially altering the impedance of the resistive load by changing its connectivity.

The change in Volts/Hz ratio essentially permits a dynamic trade-off between machine voltage and current requirements. At low speed, where winding voltage requirements are low, a low span mesh connection may be beneficially used. This low span mesh connection presents a high voltage to the inverter, and lowers the current requirements placed upon the inverter by a corresponding amount. Examined from the other side of the connection, the low span mesh connection draws low current at high voltage from the inverter, and causes high current at low voltage to flow through the windings of the machine.

As has been disclosed above, two polyphase devices may be interconnected using a mesh connection. By changing the spanning value of this mesh connection, the impedance that each device presents to the other may be altered, providing various benefits. This change in mesh connection may be described in a different yet functionally equivalent fashion. Rather than considering an N phase polyphase device being connected with 2*N sets of connections to the 2*N terminals of a second N phase polyphase device, we consider a single N phase polyphase device, with 2*N sets of terminals, internally connected in a mesh connection, to form N terminal nodes. The impedance of this N phase device with its N terminal nodes will vary as the mesh connection utilized varies.

An N phase device may be considered as being composed of N two terminal single-phase circuit elements. To form the composite N phase device, these circuit elements are connected together, in, for example, an N phase star connection or an N phase mesh connection. Once these circuit elements are connected together, then only N connections need be made to an external circuit. For example, a 10-phase motor will have 10 separate coil sets. Each coil set will have two ends, for a total of 20 coil ends which must all be connected in order to provide a current path through each of these coils. One could provide each of these 20 coil ends a connection to a source of electrical power, eg. an inverter output terminal, requiring 20 inverter output terminals. However there are two other options.

The first option is to select one terminal from each of the coil sets, an connect these 10 terminals together, leaving 10 terminals which must be connected to inverter output terminals. This is the classic star connection. Current will flow from an inverter output terminal, through the corresponding winding, to the neutral or star point. The current will then flow through other phases and back to the inverter system. With a properly balanced star connection, the total of the current through all of the phases is zero, with current flowing into some phases and out of others, and the star point will remain neutral.

The second option is the mesh connection. With the mesh connection, these 20 coil ends are connected in pairs, forming 10 terminal nodes. These 10 terminal nodes are then connected to inverter output terminals. The current through each winding flows from one of its terminals, through the winding, to the other terminal. At each of these 10 terminal nodes, there are three circuit elements connected, the inverter terminal, and two windings. The current flowing out of each of the inverter terminals is equal to the sum of the current flowing into the two connected motor windings. If current happens to be flowing out of one motor winding, and into the other motor winding, then the net current through the inverter terminal may be substantially smaller than that through the connected windings.

The voltage placed across the N two terminal circuit elements of an N phase device internally connected using a mesh connection is given by the equations above, and depends upon the number of phases, the harmonic order, and the spanning value. The switching element described above may be considered a device used to change the spanning value of a mesh connected N phase device, without reference to any connected high phase order elements.

In other words, the spanning value of a motor may be changed without reference to an inverter or generator. In this case, the switching element acts to connect the N first terminals of the N two terminal circuits of an N phase device to the N second terminals of said two terminal circuits. The variable position of the switching element corresponds to different second terminal connections for each first terminal. Each switching element position corresponds to a different spanning value, and thus a different N phase composite impedance.

It may be seen that these two descriptions are equivalent. Once a mesh connected N phase device is connected to another N phase device, each phase node consists of one phase node from each device, and each phase node of the mesh connected device consists of two terminals of two single phase elements, connected together. In a concrete example, it does not matter if this is described as a motor phase terminal electrically connected via a switching element to another motor phase terminal and thence electrically connected to an inverter terminal, or a motor phase terminal electrically connected via a switching element to an inverter terminal and thence electrically connected to another motor phase terminal.

As a mesh connected N phase polyphase device may be considered as having N terminal nodes, it is entirely possible to interconnect two N phase polyphase devices, each with a variable mesh connection.

This mesh connection technique is applicable to alternating current machines, to wound rotor synchronous machines, as well as to permanent magnet machines. It can be used both for motors and for generators, maintaining, for example, a relatively constant output voltage over a large range of generator operating speeds. This mesh connection technique may even be used for polyphase resistive loads, essentially altering the impedance of the resistive load by changing its connectivity.

The use of the mechanically switched mesh connection permits an extremely large variation in machine Volts/Hertz ratio. As shown by the equations presented, for a balanced N phase system, where N is odd, $(N-1)/2$ different Volts/Hertz ratios are possible. There is no physical reason preventing the use of spanning values greater than $L=(N-1)/2$. However it will be found that these additional mesh connections are equivalent to mesh connections less than or equal to $L=(N-1)/2$, for example, in a 9 phase system, the $L=5$ mesh connection is equivalent to the $L=4$ mesh connection, and the $L=6$ is equivalent to $L=3$. The possible range is quite large, for example, with a 17 phase machine, the Volts/Hertz ratio may be changed by a factor of 5.4:1, in 8 steps. With higher phase counts, even larger changes in Volts/Hertz ratio are possible. Useful capabilities are available even from small phase count machines. For example, in a 5 phase machine, there are two possible Volts/Hertz ratios, permitting a change of 1.6:1. With a 7 phase machine, the ratio change is 2.2:1 in three steps.

Most generally, the concept is a mechanical switch which may be used to change the impedance which a mesh connected high phase order device presents to another high phase order device. For the motor examples that we have been considering, the mesh connected device is the motor, and it is connected to an inverter. The mesh-connected device could be an array of resistors, or a magnetic induction heater. The power supply could be an inverter, a high phase order generator, or mains power properly phase shifted with transformers. The mesh-connected device could be a generator, and the other device could be an array of resistors. You could even have two mesh connected devices, each with its own mesh changing switching device, connected together.

A high phase order device is any device which is composed of similar sub-units, each of which is a single phase alternating current device, all of which are operated with different phases of alternating current. A direct current brushless motor may also be a high phase order device.

A particularly important use of this invention is to connect a star connected inverter to a mesh connected motor, using the switching device to change the particular mesh connection that the motor uses, to change the impedance that the motor presents to the inverter.

One could use this invention to connect a high phase order generator to a star connected load. Changing the mesh connection would change the impedance of the generator, and could be used to change the output voltage being supplied to the load. The load could be star connected, for example a rectifier being used to charge batteries, or it could be a mesh connected load.

One does not need an inverter for a generator, unless that generator requires a source of quadrature current. An induction generator would require some source of quadrature current, which could be an inverter, a synchronous motor, or a suitable capacitor bank. When an appropriate generator is connected to an inverter, the inverter has substantial control of the generator power output.

The winding or circuits described herein do not limit other circuit elements which may be used or attached to the present system. Multiples of the present invention may be utilized in a single device, for example a motor with an 18 phase winding may be operated using the method of the present invention as two 9 phase windings with suitable mesh connections, both wound upon the same stator.

Other examples are readily ascertainable by one skilled in the art and can be made without departing from the spirit and the scope of the present invention as defined by the following claims:

The invention claimed is:

1. An electrical rotating apparatus comprising:
    a) a first polyphase circuit element comprising N power output phases;
    b) a second polyphase circuit element comprising N single-phase sub-elements, each sub-element having an odd-numbered and an even-numbered terminal, and wherein each odd-numbered terminal is electrically connected to one of said N output phases in a first sequence, wherein the first sequence is in order of phase angle, and wherein each even-numbered terminal is electrically connected to one of said output phases in a second sequence, wherein the second sequence is the first sequence shifted according to a spanning value, L, of the mesh connection.

2. The electrical rotating apparatus of claim 1 in which said first polyphase circuit element is a polyphase inverter.

3. The electrical rotating apparatus of claim 2 in which said inverter provides N power output phases comprising a fundamental and a harmonic component.

4. The electrical rotating apparatus of claim 3 in which said harmonic component provides a substantially different phase angle difference between said odd-numbered and said even-numbered terminals of each said sub-element to a phase angle difference between said odd-numbered and said even-numbered terminals of each sub-element provided by said fundamental component, thereby affecting a change in an impedance of said apparatus.

5. The electrical rotating apparatus of claim 1 in which said first polyphase circuit comprises an inverter for supplying and changing a fundamental and harmonic content across each said single-phase sub-element of said second polyphase circuit element and wherein said second polyphase circuit element is selected from the group consisting of: alternating current machines, wound rotor synchronous machines, and permanent magnet machines.

6. The electrical rotating apparatus of claim 1 wherein said second polyphase circuit element is selected from the group consisting of: alternating current machines, wound rotor synchronous machines, permanent magnet machines, and polyphase resistive loads.

7. The electrical rotating apparatus of claim 1 in which said second polyphase circuit comprises stator windings of a brushless direct current machine comprising a permanent magnet rotor, and wherein said mesh connection having a spanning value L selected to reduce inverter current capability requirements when the machine is intended for only low speed operation, and having a spanning value L selected to reduce inverter voltage requirements, when the machine is intended to include high speed operation.

8. A changeable-span mesh-connected electrical polyphase machine having N phases, where N is an integer, comprising
    a) a polyphase circuit element having N single phase sub-elements, each comprising a first and a second terminal; and wherein each first terminal of a single-phase sub-element is connected to a second terminal of another single-phase sub-element via:
    b) an N-pole N-way switch comprising N poles connected to N ways, wherein each pole is connected to one way at a time, wherein operation of said switch connects different poles to different ways whilst keeping the same relative order, and wherein said first terminals of said N phases are each connected to an individual one of said N poles in a first sequence, and wherein said second terminals of said N phases are each connected to an individual one of said N ways in a second sequence which has been shifted in relation to the first sequence according to a spanning value, L, which represents the number of phases between said first and second terminal.

9. The changeable span mesh-connected electrical polyphase machine of claim 8 wherein said machine comprises an inverter, and wherein said inverter comprises N inverter phases, and wherein said N inverter phases are each connected in phase angle order to an individual one of said N poles of said switch.

10. The changeable span mesh-connected electrical polyphase machine of claim 8 wherein said machine is a synchronous motor comprising a permanent magnet rotor; and further comprising an inverter comprising N output phases connected to said N poles of said switch for driving the motor phases connected to said N poles.

11. The changeable span mesh-connected electrical polyphase machine of claim 8 wherein said machine is a synchronous motor comprising a wound rotor, and further comprising an inverter comprising N output phases for driving said motor, and wherein said first terminals are each connected to an inverter output phase.

12. The changeable span mesh-connected electrical polyphase machine of claim 8 wherein said machine is a resistor array and further comprising a generator for electrically feeding said resistor array, wherein said generator comprises N phase outputs, each connected to a different one of said first terminals of said phases.

13. The changeable span mesh-connected electrical polyphase machine of claim 8 wherein said switch comprises one or more properties from the group consisting of: rotary switches, slider switches, mechanical switches and electronic switches, and switches that prevent the two terminals of one motor phase from being connected together.

* * * * *